United States Patent [19]

Roge et al.

[11] 4,099,032
[45] Jul. 4, 1978

[54] LOOP CURRENT DETECTOR

[75] Inventors: Ralph R. Roge, Clarendon Hills; Paul J. Curtis, Woodridge, both of Ill.

[73] Assignee: Wescom, Inc., Downers Grove, Ill.

[21] Appl. No.: 843,712

[22] Filed: Oct. 20, 1977

Related U.S. Application Data

[63] Continuation-in-part of Ser. No. 781,204, Mar. 25, 1977, abandoned.

[51] Int. Cl.² .................... H04M 3/02; H04M 3/22
[52] U.S. Cl. .................... 179/18 FA; 179/18 HB; 179/84 R
[58] Field of Search .......... 179/18 F, 18 FA, 18 HB, 179/81 R, 84 R, 16 F

[56] References Cited

U.S. PATENT DOCUMENTS

| 3,042,816 | 7/1962 | Aagaard | 179/18 FA |
| 3,622,709 | 11/1971 | Tjaden | 179/18 FA |
| 3,889,069 | 6/1975 | Ault | 179/18 F |
| 3,914,556 | 10/1975 | Frazee | 179/18 F |
| 3,941,939 | 3/1976 | Holmes et al. | 179/18 HB |
| 3,953,682 | 4/1976 | Daniels et al. | 179/18 FA |
| 4,056,689 | 11/1977 | Freimanis | 179/18 FA |

Primary Examiner—Thomas A. Robinson
Attorney, Agent, or Firm—Leydig, Voit, Osann, Mayer & Holt, Ltd.

[57] ABSTRACT

A ground start loop current detector is used to monitor the loop current in a telephone subscriber loop when the subscriber requests service by grounding one line of the loop (ground start), when a busy subscriber discontinues use by opening the loop, and when a called subscriber answers in response to ringing by closing the loop. In order to operate in the presence of longitudinal (common mode) interference currents in the loop, especially in the ground start situation where only one line is monitored, the detector incorporates a differential amplifier which has its inputs connected to the loop through transformer windings that are phased so as to equalize the effects of longitudinal currents on the inputs of the differential amplifier.

6 Claims, 2 Drawing Figures

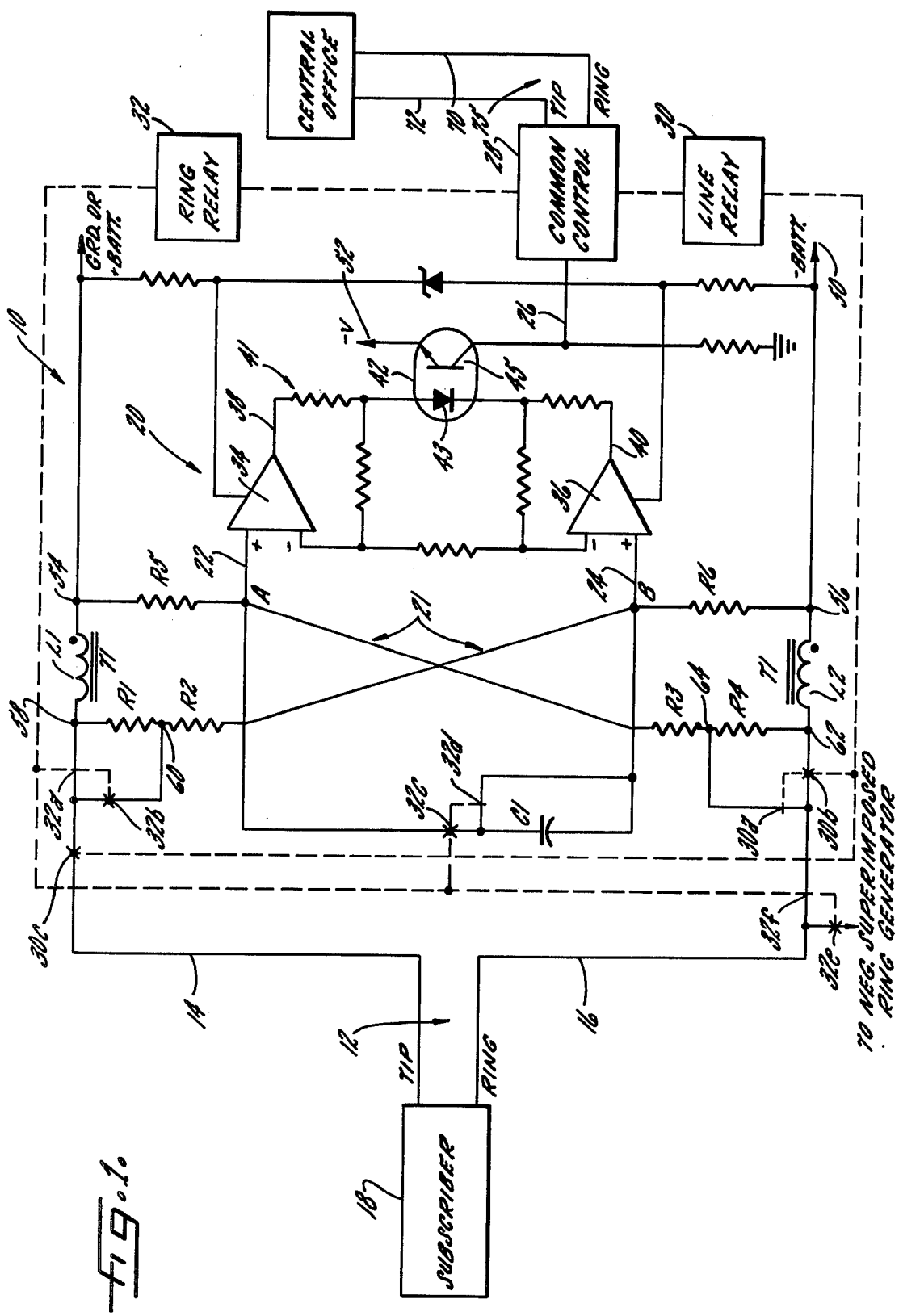

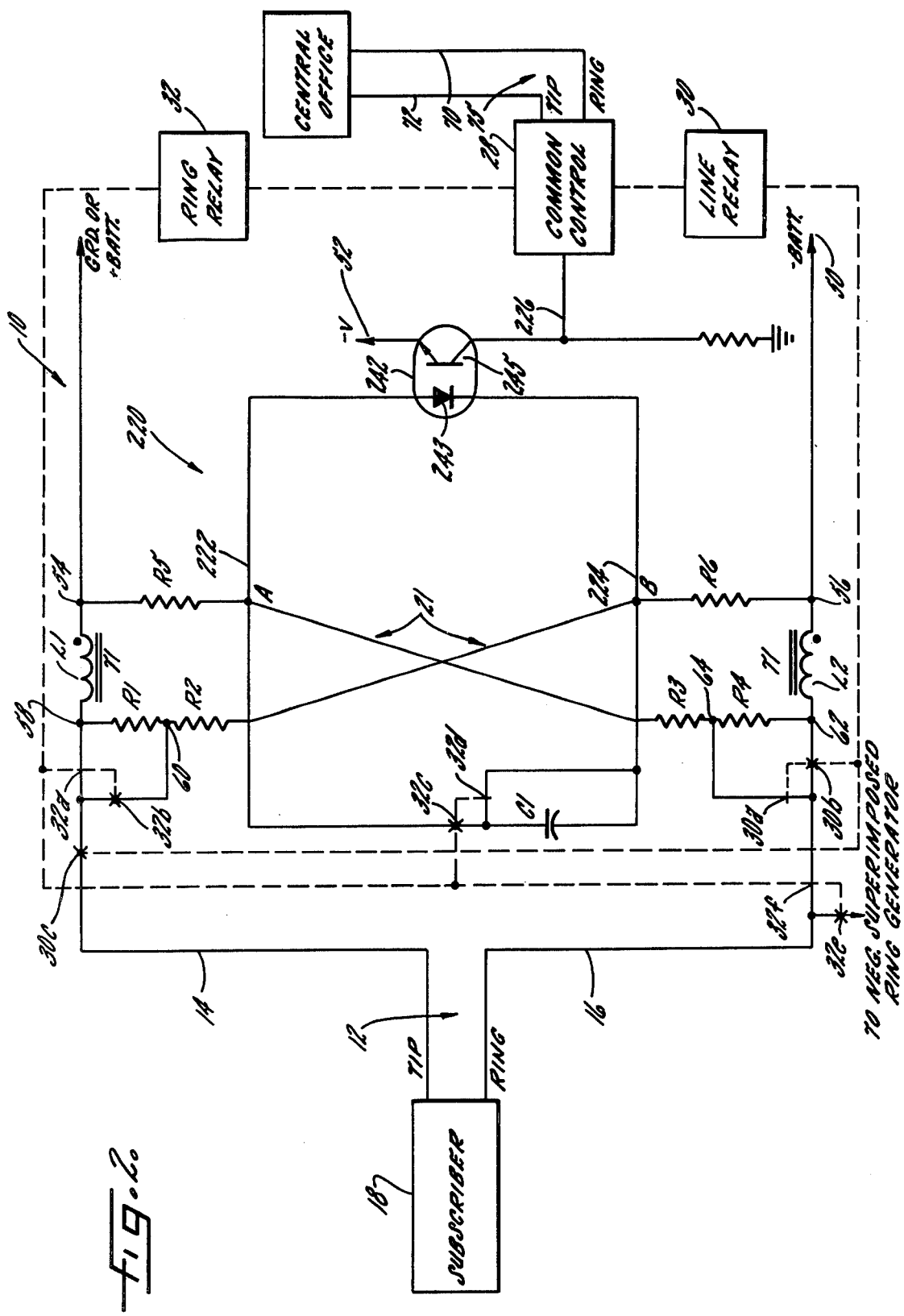

LOOP CURRENT DETECTOR

RELATED APPLICATION

This application is a continuation-in-part of our pending application Ser. No. 781,204, filed Mar. 25, 1977, now abandoned.

BACKGROUND OF THE INVENTION

This invention relates to telephony and more particularly, to a ground start loop current detector. In general, loop current detectors are used to monitor the condition of a subscriber loop by sensing the level of current in the loop and to signal the central switching equipment indicating the sensed condition of the subscriber loop.

A typical subscriber loop is characterized by four conditions. The first condition is an idle state when the subscriber is on-hook and the subscriber loop is open so that virtually no d.c. current flows in the loop. The second condition is an initial busy state when the subscriber first goes off-hook, and the ring lead is grounded. The third state is a normal busy state which immediately follows the initial busy state. In the normal busy state the subscriber loop is closed, and the ground has been removed from the ring lead. And the fourth condition is the ring state when the subscriber is on-hook, the subscriber loop is open to d.c. current and an a.c. ringing signal is being transmitted on the ring lead.

For each of these conditions, the loop detector detects the level of d.c. current in the leads of the subscriber loop and provides a control signal to the central office switching equipment so that the subscriber loop is properly serviced.

The loop current detector must accurately detect these various conditions in order to determine when a change has occurred in the status of the subscriber loop. The first change or transition from the idle to the initial busy state occurs when the subscriber requests service by going off-hook, thereby grounding the ring lead of the loop.

The second transition from the initial busy state to the normal busy occurs when the detector senses the ground on the ring lead, and associated control circuitry signals the subscriber (by grounding the tip lead) that the central office is ready. The subscriber set in response removes the ground from ring lead and closes the loop circuit.

The third transition from the normal busy to the idle state occurs when a subscriber ends a call, goes on-hook and thus opens the subscriber loop.

And the fourth transition from the ringing to the normal busy state occurs when the subscriber, responding to the ringing of his set, goes off-hook and closes the subscriber loop.

In a ground start telephone system, only the ring lead of a loop is monitored during the idle condition of the loop for the presence of the ground — thus the term "ground start". When the subscriber goes off-hook and requests service, the ring lead is grounded, and the detector senses the current flowing as a result of the grounded condition in order to initiate the transition from idle to normal busy.

The telephone industry has long been plagued by the problem of spurious a.c. currents induced into the subscriber loop (especially during the low current, high impedance idle condition) by outside instrumentalities such as power lines and other sources of electro-magnetic energy. The result of such electro-magnetic energy is to produce longitudinal (common mode) interference currents in the subscriber loop. The longitudinal currents flow in the same direction in both the tip and ring lead and thus add to the current in one lead and substract from the current in the other lead. If the longitudinal interference is sufficiently strong, these spurious currents can trigger the loop current detector and provide false indications to the central switching equipment as to the status of the subscriber loop.

Conventionally, in loop start detectors (as distinguished from ground start) differential amplifiers may be connected across the current loop in order to eliminate the effects of the longitudinal interference currents in the loop. U.S. Pat. No. 3,622,709 issued to Tjaden is illustrative of the approach of using a differential amplifier for a loop current detector.

Other approaches have been tried to eliminate longitudinal interference. U.S. Pat. No. 3,042,816 issued to Aagaard illustrates a detector that uses a transformer to cancel the effect of longitudinal current in the loop. The Aagaard patent shows a transformer having one winding connected in the tip lead circuit and a second winding connected in the ring circuit. Rather than being connected in series with the respective conductors, one of the windings parallels a battery feed resistor while the second winding serves as an input to a single ended detector. Thus, the Aagaard device does not operate in a ground start facility but, rather, requires current flow in both loop leads in order to cancel the effects of longitudinal currents.

Because in a ground start system only one lead of the subscriber loop is attached to the loop current detector during the idle condition, the conventional differential amplifier will not serve to eliminate longitudinal interference currents which are flowing in the single line being monitored, nor will the device shown in Aagaard operate connected to a single line. Insofar as applicants are aware, the prior art with its differential amplifiers and its loop current equalization circuits does not provide a solution to the unique problem of longitudinal interference currents for ground start operation when a single line of the subscriber loop is being monitored.

SUMMARY OF THE INVENTION

Therefore, it is the primary aim of this invention to provide a ground start loop detector which can monitor a single loop lead and provide immunity from the effects of longitudinal interference.

In order to provide immunity from longitudinal interference, the present invention provides for a loop current detector which incorporates transformer windings into each of the inputs of a differential amplifier. The windings are phased so that any longitudinal current flowing in the one line being monitored during the idle condition is coupled into both differential inputs and the effect of the longitudinal current is eliminated.

Collaterally, the transformer inputs provide the added advantage that they help to balance any impedance mismatches in the subscriber loop.

A subsidiary objective of this invention is to provide a ground start loop detector having variable sensitivity to sense levels of current in a subscriber loop by automatic reconfiguration of a biasing network at the inputs of the differential amplifier.

Finally, it is a further object of this invention to provide a high degree of electrical isolation between the inputs of the ground start loop detector and its output.

The input to output isolation is achieved by optically coupling the detector's differential amplifier to a unidirectional output.

Other objects and advantages will become apparent upon reading the following detailed description and upon reference to the drawings.

BRIEF DESCRIPTION OF THE DRAWINGS

FIG. 1 is a schematic diagram showing an illustrative loop current detector constructed in accordance with the present invention; and FIG. 2 is a schematic diagram for an alternative embodiment of a loop current detector constructed in accordance with the present invention.

DETAILED DESCRIPTION

While the invention will be described in connection with a preferred embodiment, it will be understood that we do not intend to limit the invention to that embodiment. On the contrary, we intend to cover all alternatives, modifications and equivalents as may be included within the spirit and scope of the invention defined by the appended claims.

FIG. 1 shows a ground start loop current detector 10 for monitoring the status of a subscriber loop 12. The subscriber loop consists of a tip lead 14, a ring lead 16 and a subscriber set 18.

The ground start loop current detector has a differential sensing means such as a differential amplifier 20 with inputs 22 and 24 and an output 26 for sensing the differential signal across a biasing means as illustrated by biasing network 21. Differential amplifier 20 consists of two operational amplifiers 34 and 36 which have outputs 38 and 40, respectively. The outputs 38 and 40 of the operational amplifiers are connected by means of a gain boost feedback circuit 41 to an opto-isolator 42 which includes a light emitting means, such as a light emitting diode 43 and a light responsive means such as a photo transistor 45. The opto-isolator 42 produces a unidirectional output signal on output line 26. The opto-isolator serves both to isolate electrically the differential amplifier's inputs 22 and 24 from the output line 26 and to change voltage levels from a line voltage battery 50 to a lower control voltage 52.

The output 26 of the differential amplifier 20 is connected to a control means, such as common control circuit 28, of conventional construction which is used to control switching means, as illustrated by line relay 30 and ring relay 32, as well as provide other control signals to the central exchange.

The biasing network 21 is provided at the inputs 22 and 24 of the differential amplifier 20. The biasing network establishes the no signal condition for the differential amplifier and the d.c. sensitivity of the loop detector. In the absence of any signal from the subscriber loop (the loop is idle), the biasing network provides a balanced (nondifferential) d.c. signal to the differential amplifier 20.

The biasing network 21 includes transformer T1 with windings L1 and L2 connected in series with the battery 50 and the tip and ring lead respectively. The transformer is connected and phased so that any a.c. signal appearing in one winding is coupled into the other winding in order to cancel the effects of each other at the respective amplifier inputs and retain the d.c. balance established by the biasing network at the differential inputs 22 and 24.

The windings L1 and L2 being in series with the loop leads and the battery 50 collaterally provide a higher a.c. input impedance than a direct connection to the battery 50. As a result of the higher input impedance, the effects of line impedance mismatch are reduced, and transients are more readily damped.

In order to establish the detector's d.c. sensitivity, the biasing network includes positive ground node 54 and negative voltage node 56. Ground node 54 is connected to input 24 through a first branch consisting of winding L1 of transformer T1 and resistors R1 and R2. Ground node 54 is also connected to input 22 through a second branch consisting of resistor R5. Negative voltage node 56 is connected to input 22 through a third branch consisting of winding L2 of the transformer T1, and resistors R4 and R3. Negative voltage node 56 is also connected to input 24 through a fourth branch consisting of resistor R6.

The ring and tip leads are connected to the biasing network 21 through line relay 30 and ring relay 32. The relays switch the leads to various points on the biasing network to provide the proper d.c. sensitivity for each of the conditions to be sensed. Specifically, tip lead 14 is connected alternatively to node 58 or 60, depending on the condition of ring relay 32. Ring lead 16 is alternatively connected to node 62 or 64, depending on the condition of line relay 30. The effect of the relays on varying sensitivity will be considered with respect to the various loop conditions set out below.

A capacitor C1 for filtering out ringing interference is switchably connected across inputs 22 and 24 by ring relay 32 and the operation of contracts 32c and 32d.

The operation of the loop current detector 10 is best understood by focusing on the various conditions which the loop current detector senses and the transitions between those conditions. The first condition is when the line is idle — the loop is open. In the idle condition, the common control 28 de-energizes both line relay 30 and ring relay 32. As a result, contact 30c is open and the tip lead is disconnected from the loop current detector altogether. The ring lead 16 is connected to node 64 of the loop current detector through contacts 32f and 30a thereby forming a path from battery 50 through resistor R4 and winding L2 of transformer T1 to the ring lead. The biasing network provides a balanced d.c. input to the differential amplifier and no output signal is generated by the opto-isolator on line 26.

If in the idle condition a longitudinal interference current is generated in the ring lead, that transient longitudinal current flowing in the ring lead is conducted through resistor R4 and winding L2 of transformer T1. Because the longitudinal current flowing in L2 is transient in nature and because L2 is magnetically coupled to winding L1 and the windings are phased as indicated in the drawing, a similar induced current flows in winding L1. As a result, equal currents flow in L1 and L2, the biasing network remains balanced, and the effects of the longitudinal current in the ring lead are eliminated.

When the subscriber goes off-hook, thereby grounding the ring lead, a d.c. current flows in resistor R4 (100 ohms) and winding L2 (100 ohms, d.c. resistance). The series resistance of R4 and L2 establishes a sensitivity of approximately 6 milliamperes of current in the ring lead. Because the d.c. current is not coupled by the transformer, the 6 or more milliampere flow of the d.c. current in resistor R4 and winding L2 causes input 22 of operational amplifier 34 to become more positive. In turn, output 38 goes more positive. Input 24 is sufficiently negative with respect to input 22 to cause the output 40 of operational amplifier 36 to go negative, thus augmenting the forward signal across the light emitting diode 43. With a differential voltage across light emitting diode 43 of the opto-isolator 42, the diode produces light. The light causes photo transistor 45 to conduct and an output signal results on the output 26.

In response to the output signal, the common control unit 28 places a ground on ring lead 70 of central office loop 75. The central office in conventional fashion provides a ground on tip lead 72. This tip lead ground condition causes common control 28 to energize line relay 30. Energizing relay 30 connects tip lead 14 to d.c. ground through winding L1 which signals the subscriber to remove the ground on ring lead 16 and close subscriber loop 12 for the normal busy condition. Energizing line relay 30 also reconnects ring lead 16 to the biasing network at node 62 so that the current flows in the subscriber loop between battery 50 and ground. The current path includes the two transformer windings and the closed subscriber loop. The d.c. loop current flowing through the transformer windings produces a differential d.c. voltage across the inputs 22 and 24 with input 22 being more positive. As a result, the output signal on line 26 is sustained. The d.c. voltage drop across the windings (each having a d.c. resistance of 100 ohms) thus determines the detector's sensitivity (at least 6 milliamperes of loop current), for determining when the loop is busy.

If during the normal busy condition longitudinal interference is produced in the loop, the longitudinal currents flow in both leads and produce a simultaneous voltage rise or drop at both inputs 22 and 24 of the differential amplifiers 20. Therefore, no differential signal relating to the longitudinal currents results at the inputs, and the output 26 of the detector remains unaffected.

When the subscriber subsequently decides to go on-hook, the subscriber loop is opened, and the d.c. loop current drops below 6 milliamperes. As a result, the d.c. voltage drop across the windings L1 and L2 is diminished, and inputs 22 and 24 detect no differential signal. With no differential input signal, the differential amplifier 20 drops the output signal on output 26 which indicates that subscriber loop 12 is now idle. The common control 28 then opens central office loop 75. The central office in turn removes the ground from tip lead 72 of the central office loop, and common control 28 de-activates line relay 30 so that the detector circuit returns to its idle condition with tip lead 14 of subscriber loop 12 disconnected and ring lead 16 switched from node 62 to node 64 in order to await the next request for service indicated by the grounding of ring lead 16.

Finally, the loop current detector also operates as a ring trip detector during a ringing condition. Prior to ringing, the loop is in the idle condition. In response to a command from the central office, the common control activates both ring relay 32 and line relay 30. When the ring relay 32 is activated, a negative ring generator (not shown) is connected to the ring lead by the closing of contacts 32e while contact 32f is simultaneously opened thereby disconnecting the ring lead from the detector. Line relay 30 is activated in anticipation of the busy condition which is expected to result. Activating line relay 30 closes relay contact 30c to connect the tip lead to node 60 through closed contact 32b so that the tip lead is connected in series with resistor R1 and winding L1. The series resistance of R1 and L1 establishes the d.c. sensitivity of the detector for detecting when the loop is subsequently closed. In addition, ring relay contact 32c is closed to connect capacitor C1 across inputs 22 and 24 of the differential amplifier 20 to filter out the 20 hz. component of the ringing signal.

When the subscriber goes off-hook in response to the ringing at his subscriber set, he closes subscriber loop 12 so that d.c. current then can flow through winding L1, resistor R1, tip lead 14, subscriber set 18, the ring lead and the negative ring generator. This d.c. loop current is not coupled through transformer T1. The d.c. voltage drop across resistor R1 and winding L1 causes input 24 to become more negative with respect to input 22. This causes output 38 to go positive and output 40 to go negative, thus forward biasing diode 43 so that an output occurs on line 26. The signal at output 26 causes the common control to de-activate the ring relay 32, thereby disconnecting the ring generator from the ring line and reconnecting the ring line through contact 32f to node 62 by way of contact 30b (the line relay still being in the active condition). Furthermore, the tip lead is switched from node 60 to node 58 by the operation of contacts 32a and 32b. The capacitor C1 is also disconnected from the inputs 22 and 24 by the operation of contacts 32c and 32d. The line then is in the normal busy condition with line relay 30 activated and the detector waiting for the subscriber to go on-hook again to restore the loop to its idle condition.

Referring to FIG. 2, the loop current detector 10 is provided with an alternative differential amplifier 220. The differential amplifier 220 has inputs 222 and 224 and an output 226, for sensing the differential signal across biasing network 21. The differential amplifier 220 consists of a low input current, high gain opto-isolator 242. The opto-isolator 242 includes a light emitting means, such as a light emitting diode 243, and a light responsive means, such as a photo-transistor 245. The opto-isolator 242 produces a unidirectional output signal on output line 226. The opto-isolator 242 serves both to isolate electrically the differential amplifier's inputs 222 and 224 from the output line 226, and to change voltage levels from a line voltage battery 50 to a lower control voltage 52.

The opto-isolator 242 is commercially available, such as model 4N45/46 opto-isolator, manufactured by Hewlett Packard.

The differential amplifier 220 with opto-isolator 242 operates in essentially the same manner as the differential amplifier 20 of FIG. 1. In all other regards, the operation of the circuitry disclosed in FIG. 2, except for the use of differential amplifier 220, is essentially the same as the operation as the circuit disclosed in FIG. 1 and previously described.

We claim as our invention:

1. A ground start loop current detector for detecting the grounding of one of two leads of a battery energized telephone loop in presence of longitudinal interference currents in the loop, the detector comprising:
 (a) differential sensing means having two differential input terminals and an output terminal which output terminal provides an output signal in response to a differential input signal level resulting when the one loop lead is grounded; and
 (b) biasing means including first and second inductors, the biasing means interconnecting the differential input terminals and the one lead of the telephone loop and establishing the differential signal level at the input terminals when the one loop lead is grounded, and the inductors electrically connected to the differential input terminals respectively and magnetically coupled together, in phased relationship so that longitudinal interference currents in the one loop lead mutually induce nondifferential signals at the input terminals of the sensing means.

2. A ground start loop current detector according to claim 1, further comprising:
 (a) control means connected to the output terminal of the differential sensing means and operable in response to the output signal; and
 (b) switching means operably controlled by the control means, the switching means being interposed between the loop leads and the biasing means and operable to connect both loop leads to the biasing means so that a steady state current in the loop produces a differential signal at the differential input terminals of the differential sensing means.

3. A ground start loop current detector according to claim 2, wherein the biasing means includes a four branch network with the inductors connected in opposite branches of the network and the loop leads being switchably connected by the switching means to those opposite branches.

4. A ground start loop current detector according to claim 2, wherein the differential sensing means includes an opto-isolator at the output terminal of the sensing means to provide electrical isolation between the differential sensing means and the control means.

5. A ground start loop current detector for detecting the grounding of one of two leads of a battery energized telephone loop in the presence of longitudinal interference currents in the loop, the detector comprising:
 (a) differential sensing means having two differential input terminals, at least two amplifiers being interconnected in feedback relationship to increase overall gain of the sensing means, an opto-isolator connected to the amplifiers and having an output terminal so that a differential signal across the input terminals creates a differential signal by means of the amplifiers across the opto-isolator, thereby producing an output signal at the output terminal;
 (b) a four branch biasing network for interconnecting the one loop lead and the two input terminals, including first and second inductors in opposite branches thereof, the biasing network being adapted for providing a balanced nondifferential signal at the two input terminals when no steady state current flows in the telephone loop and wherein the inductors are electrically connected to the differential input terminals respectively and magnetically coupled together in phased relationship so that longitudinal interference in the one loop lead mutually induces nondifferential signals at the input terminals of the sensing means; and
 (c) control means including switching means wherein the control means is connected to the output terminal of the differential sensing means and energizes the switching means, the switching means adapted to provide a first state for detecting d.c. current in the ring lead and a second state for sensing d.c. current in the telephone loop.

6. A ground start loop current detector for detecting the grounding of one of two leads of a battery energized telephone loop in the presence of longitudinal interference currents in the loop, the detector comprising:
 (a) differential sensing means having two differential input terminals, an opto-isolator connected to the input and having an output terminal so that a differential signal across the input terminals causes the opto-isolator to produce an output signal at the output terminal;
 (b) a four branch biasing network for interconnecting the one loop lead and the two input terminals, including first and second inductors in opposite branches thereof, the biasing network being adapted for providing a balanced nondifferential signal at the two input terminals when no steady state current flows in the telephone loop and wherein the inductors are electrically connected to the differential input terminals respectively and magnetically coupled together in phased relationship so that longitudinal interference in the one loop lead mutually induces nondifferential signals at the input terminals of the sensing means; and
 (c) control means including switching means wherein the control means is connected to the output terminal of the differential sensing means and energizes the switching means, the switching means adapted to provide a first state for detecting d.c. current in the ring lead and a second state for sensing d.c. current in the telephone loop.

* * * * *